United States Patent [19]

Nezu

[11] 4,004,279
[45] Jan. 18, 1977

[54] METHOD AND APPARATUS FOR CONTROLLING DATA TRANSFER BETWEEN INPUT AND OUTPUT DEVICES AND A DIRECT DIGITAL CONTROLLER

[75] Inventor: Kazuo Nezu, Hachioji, Japan

[73] Assignee: Yokogawa Electric Works, Ltd., Musashino, Japan

[22] Filed: Nov. 1, 1974

[21] Appl. No.: 520,027

Related U.S. Application Data

[63] Continuation-in-part of Ser. No. 45,728, June 12, 1970, Pat. No. 3,710,326.

[52] U.S. Cl. .............................. 340/172.5
[51] Int. Cl.² .................. G06F 3/04; G08B 11/00
[58] Field of Search ............... 340/172.5; 445/1

[56] References Cited

UNITED STATES PATENTS

| | | | |
|---|---|---|---|
| 3,302,181 | 1/1967 | Lee | 340/172.5 |
| 3,378,820 | 4/1968 | Smith | 340/172.5 |
| 3,407,387 | 10/1968 | Looschen et al. | 340/152 |
| 3,456,242 | 7/1969 | Lubkin et al. | 340/172.5 |
| 3,469,243 | 9/1969 | Willcox et al. | 340/172.5 |
| 3,593,299 | 7/1971 | Driscoll et al. | 340/172.5 |
| 3,693,163 | 9/1972 | Johnson et al. | 340/172.5 |
| 3,710,326 | 1/1973 | Nezu et al. | 340/172.5 |

*Primary Examiner*—Gareth D. Shaw
*Assistant Examiner*—Jan E. Rhoads
*Attorney, Agent, or Firm*—Charles E. Pfund

[57] ABSTRACT

A digital controller comprises digital operating and processing means including an offering signal input terminal, an answerback signal input terminal, a data output bus, an input and output device designating bus, and a control signal bus; a plurality of output registers; a flip-flop circuit for storing an offering signal; a decoder circuit responsive to signals from the input and output designating bus and from the control signal bus to produce a control signal corresponding to a code signal for the decoder circuit when the code signal is designated and to reset an output register designated by a particular bit of the data output bus in response to a signal generated by a signal impressed upon the answerback signal input terminal to reset the flip-flop circuit for storing the offering signal; said plurality of register circuits being connected to receive an output signal from the operating and processing means designated by a particular bit of the data output bus; an offering signal holding circuit to hold a signal read out command for the operating and processing means and to apply the command upon the offering signal input terminal; and a logic circuit connected to receive an output signal from the output registers, a signal of a particular bit of the data output bus and an output signal from the offering signal holding circuit to produce a signal for the answerback signal input terminal corresponding to said three signals.

2 Claims, 3 Drawing Figures

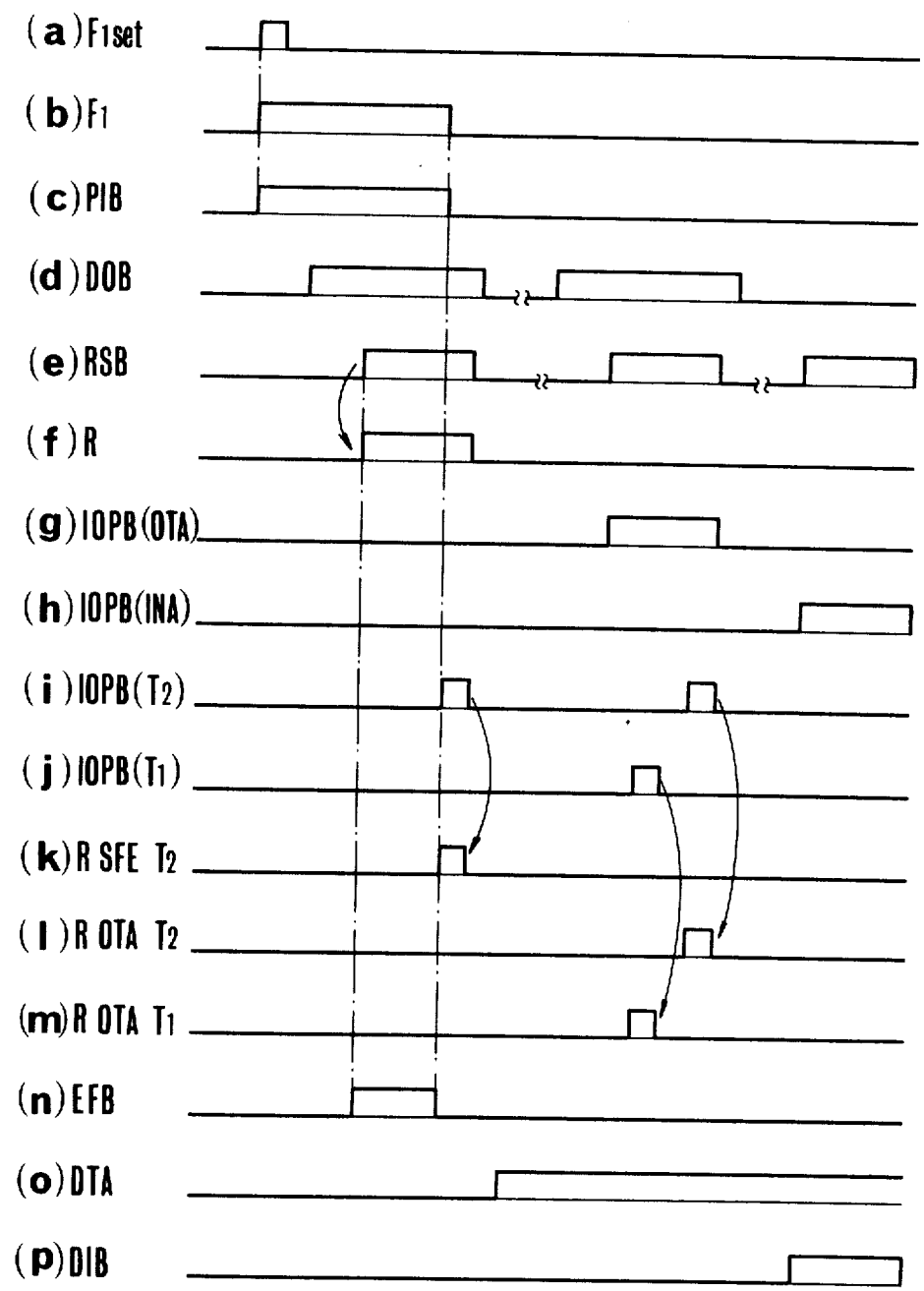

METHOD AND APPARATUS FOR CONTROLLING DATA TRANSFER BETWEEN INPUT AND OUTPUT DEVICES AND A DIRECT DIGITAL CONTROLLER

CROSS REFERENCE TO RELATED APPLICATION

This application is a continuation-in-part of copending joint application Ser. No. 45,728, filed June 12, 1970, now U.S. Pat. No. 3,710,326, the disclosure of which is incorporated by reference.

BACKGROUND OF THE INVENTION

This invention relates to a method and apparatus for controlling data transfer between input and output devices and a direct digital controller.

Different from the prior art analogue adjusting meter, the direct digital controller (DDC) is a device for sequentially controlling a plurality of processes or the like directly by a digital operation circuit.

Since a DDC controls a plurality of input and output devices operating simultaneously, input and output signals processed thereby are complicated and are abundant in number. For this reason the construction of the various input and output devices is not only complicated but also expensive.

In the prior art DDC, each of registers for reading out or writing in is assigned with a particular designating code and the designation of register is performed by said particular code. Therefore decoders in the input and output circuit are required equal to the number of registers, which means that the input and output circuits become complicated and that in case of installing input and output registers the number of decoder circuits corresponding thereto is increased. This requires the change of the circuits for input and output devices and the provision of the input and output devices for respective apparatus.

In the prior art when transferring data to and from the DDC, each of the input and output devices is assigned with a particular designating code within the data being transferred. Therefore, decoders equal to the number of input and output devices are required.

SUMMARY OF THE INVENTION

It is an object of this invention to provide a novel method and apparatus for controlling data transfer between input and output devices of a direct digital controller capable of greatly decreasing the number of decoders required.

Another object of this invention is to provide such an apparatus and method allowing one to readily increase the number of read out registers.

It is another object to provide a method and apparatus for controlling the transfer of data from a processor of a direct digital controller to a plurality of output terminals whereby the processor is signaled when it is transferring data to the proper one of the terminals.

According to one aspect of this invention there is provided a method of controlling the input and output device comprising a plurality of registers and exchanges of information between it and an operating and processing device of a direct digital controller, said method comprising the steps of grouping said plurality of registers into one group, designating said group by a signal of a data bus for designating the input and output device and selecting a given register in the group by utilizing a portion of the bits of the data output bus whereby to select the input and output device.

According to another aspect of this invention there is provided a direct digital controller comprising digital operating and processing means including an offering signal input terminal, an answerback signal terminal, a data output bus, an input and output device designating bus, and a control signal bus; a plurality of output registers; a flip-flop circuit for storing an offering signal; a decoder circuit responsive to signals from the input and output designating bus and from the control signal bus of the digital operating and processing means to produce a control signal corresponding to a code signal for the decoder circuit when the code signal is designated and to reset an output register designated by a particular bit of the data output bus in response to a signal generated by a signal impressed upon the answerback signal terminal to reset the flip-flop circuit for storing the offering signal; said plurality of register circuits being connected to receive an output signal from the operating and processing means designated by a particular bit of the data output bus; an offering signal holding circuit to hold a signal readout command for the operating and processing means and to apply said command upon the offering signal input terminal; and a logic circuit connected to receive an output signal from the output registers, a signal of a particular bit of the data output bus and an output signal from the offering signal holding circuit to produce a signal for the answerback signal input terminal of the operating and processing means corresponding to said three signals.

BRIEF DESCRIPTION OF THE DRAWINGS

In the accompanying drawing:

FIG. 2 shows waveforms to explain the operation of this invention.

DESCRIPTION OF THE PREFERRED EMBODIMENT

Figure 1:
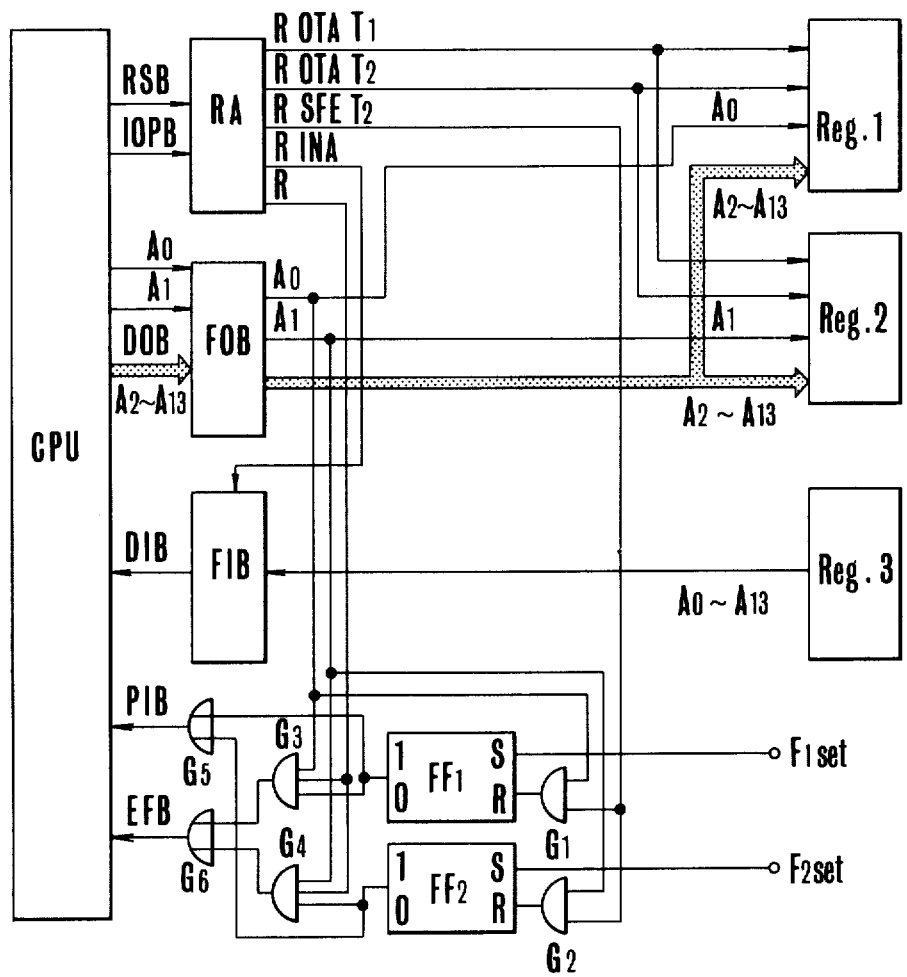
FIG. 1 shows a block diagram of a control system for transferring data between input and output devices and a direct digital controller embodying this invention.

In the embodiment of this invention shown in FIG. 1 CPU represents a digital operating and processing device utilized to control and part of a direct digital controller (DDC). The operating and processing device CPU is provided with an input terminal PIB for an offering signal, an input terminal EFB for receiving an answerback signal, a data output bus DOB, a data input bus DIB, an input and output device designating bus RSB for providing a signal dependent on the type of offering signal and a control signal bus IOPB.

Figure 1A:
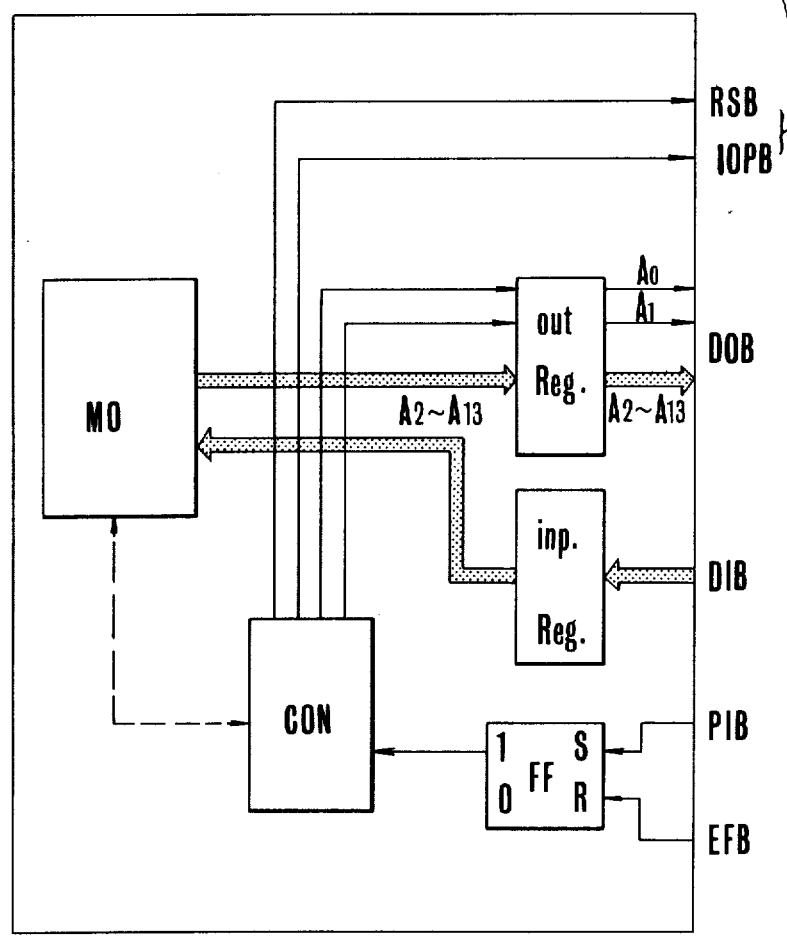
FIG. 1A is a block diagram showing portions of the CPU operation related to the invention.

In the digital operating and processing device CPU, details of which are shown in FIG. 1A, a symbol FF represents a flip-flop circuit for storing the offering signal, and CON an operation controlling circuit. MO designates an internal memory device of the digital operating and processing device CPU, OUT Reg., an output register, and Inp. Reg., an input register. The output register Out Reg. temporarily stores output signals from the digital operating and processing device CPU. The input register Inp. Reg. functions to temporarily store signals supplied to the digital operating and processing device CPU. The operation controlling circuit CON generates control signals for effecting the exchange of data between the main memory device MO and output register Out Reg. and input register Inp. Reg., the process of offering signals, and the controlling of usual operating functions.

A decoder RA is provided to receive signals from input and output device designating bus RSB and control signal bus IOPB to generate various control pulses. To amplify the output data from digital operating and processing device CPU there is provided a buffer amplifier FOB, and to write signals from external registers into operating and treating device CPU there is provided a gate circuit FIB. Registers Reg. 1 and Reg. 2 receive output signals from operating and processing device CPU via decoder RA and buffer FOB. Register Reg. 3 functions to store signals supplied to the operating and processing device CPU. Input terminals $F_1$ set and $F_2$ set are provided to receive the offering signals which request the transfer of output data from the CPU to Reg. 1 and Reg. 2. These input terminals are connected to flip-flop circuits $FF_1$ and $FF_2$, respectively which store the offering signal. There are also provided AND gate circuits $G_1$, $G_2$, $G_3$ and $G_4$ and OR gate circuits $G_5$ and $G_6$. As shown in FIG. 1 the input and output device designating bus RSB and the control signal bus IOPB of the operating and processing device CPU are connected to input terminals of decoder circuit RA. Data output bus DOB of CPU is connected to buffer amplifier FOB with its output terminals connected to registers Reg. 1 and Reg. 2. Data input bus DIB is connected to register Reg. 3 through the gate circuit FIB, and offering signal input terminals $F_1$ set and $F_2$ set are connected to respective set signal input terminals of respective flip-flop circuits $FF_1$ and $FF_2$. The set signal output terminal 1 of flip-flop circuit $FF_1$ is connected to the offering signal input terminal PIB of CPU via OR gate circuit G5 and to the answerback signal input terminal EFB of CPU through AND gate circuit $G_3$ and OR gate circuit $G_6$. The set signal output terminal 1 of flip-flop circuit $FF_2$ is connected to the offering signal input terminal PIB of CPU through OR gate circuit $G_5$ and to the answerback signal input terminal EFB of CPU through OR gate $G_6$ and AND gate $G_4$. The output terminals of decoder circuit RA are coupled to registers Reg. 1 and Reg. 2, gate circuit FIB and AND gate circuits $G_1$ through $G_4$.

The control system for the input and output devices of the direct digital controller embodying this invention operates in the following manner.

When an input signal as shown in FIG. 2a is applied to the offering signal input terminal $F_1$ set the flip-flop circuit $FF_1$ is reset to produce a set output signal as shown in FIG. 2b. The set output signal from flip-flop circuit $FF_1$ is applied to the offering signal input terminal PIB via OR gate circuit $G_5$ to set the flip-flop circuit FF for storing the offering signals of CPU, thereby generating a signal as shown in FIG. 2c. The signal of FIG. 2c is applied to the operation controlling circuit CON. Thus, the operation controlling circuit CON recognizes the application of the offering signal so that it discontinues the program which has been prosecuted and begins to interrogate a terminal on which the offering signal has been applied.

In this regard, the format of code signals for exchanging information between the digital operating and processing device CPU and registers Reg. 1, Reg. 2 and Reg. 3 is prescribed as shown in the following table where $A_0$–$A_{13}$ represent the individual bits of a binary coded signal composed of 14 bits.

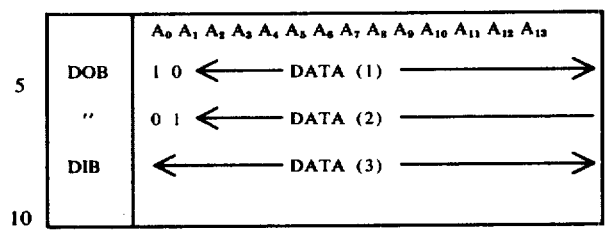

More particularly, where the first bit $A_0$ of the code signal of the data output bus DOB is 1 and the second bit $A_1$ thereof is 0 a code signal is to be sent out to register Reg. 1, whereas, when the first bit $A_0$ is 0 and the second bit $A_1$ is 1 a code signal is to be sent out to register Reg. 2 so that when code signals are sent out the first two bits of the data output bus are utilized to select one of the registers Reg. 1 or Reg. 2. When writing a signal from register Reg. 3 into CPU via data input bus DIB this signal is utilized to write all bit signals.

The operation controlling circuit CON sets the first bit $A_0$ of the output register Out Reg. to 1 and the second bit $A_1$ thereof to 0, and the signals to be sent to the register Reg. 1, which have been stored in the memory MO, are set to the third bit and the following bits $A_2$ to $A_{13}$, thereby sending code signals as shown in FIG. 2d for the output register Reg. 1 to buffer FOB.

Accordingly, the code signals utilized as a signal are only twelve bits of $A_2$ to $A_{13}$ and the initial 2 bits $A_0$ and $A_1$ are not used for sending signals but for discriminating offering signals. However, since almost all signals treated by the direct digital controller are digital, it is not frequently required to use all the 14 bits $A_0$ to $A_{13}$ and the efficiency is not degraded by the above method.

Concurrently with the application of output signal from the operation controlling circuit CON to the buffer FOB, a code signal as shown in FIG. 2e for selecting the registers is sent from the output terminal RSB so as to be applied to the decoder circuit RA. Upon reception of its own code signal, the decoder circuit RA provides on its output terminal R a signal as shown in FIG. 2f which in turn is applied to gate circuits $G_3$ and $G_4$. The gate circuit $G_3$ is enabled by the 1 signal of the first bit of FOB and the set output signal from flip-flop circuit $FF_1$ so as to apply a signal as shown in FIG. 2n on terminal R of decoder circuit RA on the answerback input terminal EFB of CPU through gate circuits $G_3$ and OR gate circuit $G_6$. Upon application of the answerback signal EFB, the flip-flop circuit of the flag for displaying the offering signals is reset by EFB, so that the operation controlling circuit CON confirms, by the code signals and signals $A_0$ and $A_1$ of the first and second bits of data output bus DOB which are sent at that time, that a signal has been applied to the offering signal input terminal $F_1$. In response to the answerback signal, the operation controlling circuit CON operates to sent out a control signal of IOPB ($T_2$) as shown in FIG. 2i to the decoder circuit RA so that a reset signal for Reg. 1 as shown in FIG. 2m is sent out of the output terminal $ROTAT_1$ of decoder circuit RA to reset Reg. 1. Thereafter, CON sends out a signal of IOPB ($T_1$) as shown in FIG. 2j to the decoder circuit RA so that a set signal for Reg. 1 as shown in FIG. 2l is sent out of the terminal $ROTAT_2$ of decoder circuit RA, thereby writing the code signal for buffer FOB in register Reg. 1.

Prior to this, a reset signal as shown in FIG. 2k for the flip-flop circuits $FF_1$ and $FF_2$ is sent out from output terminal $RSFET_2$ of the decoder circuit RA which is applied through AND gate circuits $G_1$ and $G_2$. At this time since gate circuit $G_1$ is enabled by the 1 signal of the first bit $A_0$ of buffer FOB (gate circuit $G_2$ is disenabled by the 0 signal of the second bit $A_1$), the reset signal will be applied through gate circuit $G_1$ to reset flip-flop $FF_1$ thus completing the reception of a signal on the offering terminal $F_1$ set.

Where an offering signal is applied on offering terminal $F_2$ set and when a code for decoder circuit RA is designated by the similar operation as described above a signal is sent out from output terminal R of decoder circuit RA which is coupled to gate circuits $G_3$ and $G_4$. Concurrently therewith data output bus DOB supplies to buffer FOB code signals for register Reg. 1 wherein the fist bit $A_0$ is encoded at 1 and the second bit $A_1$ and 0 but at this time since AND gate circuit $G_3$ does not receive an enabling signal from flip-flop $FF_1$, the signal sent from the terminal R of decoder circuit RA will not be impressed upon the answerback signal input terminal EFB of CPU. For this reason, the decoder RA repeats again the above-described operation to send from data output bus DOB but this time the bits are arranged so that the first bit $A_0$ is encoded as 0 and the second bit $A_1$ as 1. At this time the signal from terminal R of decoder circuit RA is coupled to the answerback signal input terminal EFB of CPU via gate circuit $G_4$ now being enabled by the 1 signal of the second bit $A_1$ and the set output signal of flip-flop circuit $FF_2$ thus confirming the fact that a signal has been impressed upon terminal $F_2$. Whereupon CPU sends a control signal to decoder circuit RA in the same manner as above-described to reset flip-flop circuit $FF_2$ by the signal from decoder circuit RA and at the same time to cause buffer FOB to supply data to Reg. 2.

In the foregoing description, the register Reg. 1 reads out a signal from CPU by means of offering signals of the terminal $F_1$ and the register Reg. 2 reads out a signal from CPU by means of offering signals of the terminal $F_2$. However, since the interrogating operation of signals of the offering terminals $F_1$ and $F_2$ and the operation of CPU by the offering signals applied on $F_1$ and $F_2$ are determined optionally, it is possible to cause the registers Reg. 1 and Reg. 2 to perform other function than that of reading out a signal from CPU by using signals applied to $F_1$ to $F_2$.

To write the data in register Reg. 3 into the digital operating and processing device CPU, a write command signal INA is supplied to decoder circuit RA from CPU concurrently with the application of a data write signal RINA upon signal writing gate circuit FIB from decoder circuit RA to transfer the content of register Reg. 3 to operating and processing device CPU through data input buffer FIB.

In this embodiment, since signals of the register Reg. 3 are measured signals representative of temperature, pressure and the like and written into the digital operating and processing device CPU at a predetermined cycle, CPU supplies write command signals RINA at every predetermined interval without receiving any special offering signals from the register Reg. 3 and automatically writes the content of the register Reg. 3.

In case that the content of Reg. 3 is not written into the digital operating and processing device CPU periodically as the above embodiment does, it is possible to provide an offering terminal corresponding to the register Reg. 3 and operate the same to write at a desired time.

While the above description refers to only one output group comprising a set of two registers (Reg. 1, Reg. 2), it is usual to provide a plurality of such groups assigned with respective register select codes. In such a case the number of registers for each offering groups may be any desired number.

According to this invention, in writing a signal from a CPU into an output device as registers Reg. 1, Reg. 2, a write circuit is controlled by using a register select code. Such a designating code could also be used to discriminate between groups of registers rather than individual registers. Moreover, since each register of each group could be designated by a particular bit 1 or 0 of the data output bus it is possible to discriminate between the different registers of each group on this basis. Thus, with this invention, one may greatly decrease the number of decoders in the signal readout circuit than is possible with the prior art devices thus simplifying the construction of the input and output device. Moreover, according to this invention it is possible to readily increase the number of readout registers without changing the designating code.

What is claimed is:

1. A direct digital controller for interfacing a plurality of operating groups with a digital computer, said computer having
 an offering signal input terminal,
 an answerback signal input terminal,
 a data output bus for supplying digital data signals including register selecting bits,
 an input and output device designating bus, and
 a control signal bus,
comprising:
 a plurality of output registers for each said group;
 a flip-flop and set terminal input corresponding to each of said output registers, each said flip-flop operable for storing an offering signal applied to its set terminal;
 a decoder circuit for each said group responsive to signals from said input and output designating bus and from said control signal bus of said digital computer to produce decode control signals upon receipt of the respective code signal for a group;
 a logic circuit
  for applying set signals on said flip-flops to said offering input terminal and
  for applying an AND gated signal to said answerback input terminal upon coincidence of said decode control signal for said group, said register selecting bits from said data signal and a set output from the one of said flip-flops corresponding to the register selected by said data signal, thereby producing an answerback signal in said digital computer
 said decode control signals providing in response to said answerback signal
  a reset signal for the selected output register,
  a write in signal for entering data on said data output bus in said selected output register, and
  a reset signal for the set flip-flop corresponding to said selected output register.

2. Apparatus according to claim 1 wherein said computer also has a data input bus and a source of write command signals and said direct digital controller has a data input register and writing gate controlled means for writing data from said input register on said data input bus, said decoder for a selected group responsive to said write command signals for enabling said writing gate controlled means.

* * * * *